Sept. 8, 1925.
D. R. HOOK
GAS BURNER FITTING
Filed March 27, 1924
1,553,164
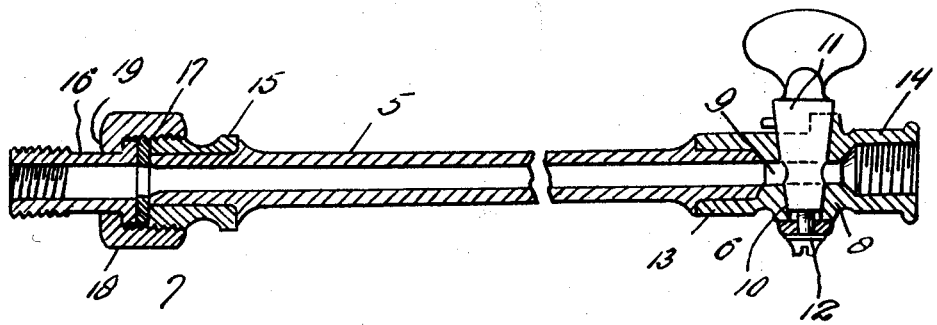
D. R. Hook,
Inventor
By Clarence A. O'Brien
Attorney Patented Sept. 8, 1925.

1,553,164

UNITED STATES PATENT OFFICE.

DAVID R. HOOK, OF BUTLER, PENNSYLVANIA.

GAS-BURNER FITTING.

Application filed March 27, 1924. Serial No. 702,406.

*To all whom it may concern:*

Be it known that DAVID R. HOOK, a citizen of the United States, residing at Butler, in the county of Butler and State of Pennsylvania, has invented certain new and useful Improvements in Gas-Burner Fittings, of which the following is a specification.

This invention relates to an improvement in fittings for gas burners and has more particular reference to a fitting that is to be sold upon the open market so as to allow houses and the like to operatively connect gas stoves, burners, grates, etc., to the gas supply pipes in a novel, and expeditious manner and without requiring the provision of a multiplicity of pipes, elbow connections and the like.

The main object of the invention is to provide a fitting of the above character wherein the same comprises a desirable length of flexible lead piping provided with means at its opposite ends for allowing the opposite ends of this pipe to be readily attached to the gas stove, grate or other form of burner and to the gas supply pipe even though said gas supply pipe and the inlet of the burner, stove or grate are greatly out of alinement with each other, it being obvious that said flexible lead pipe section may be bent so as to allow such connection.

A further object of the invention is to provide a fitting of this character wherein one of the end members of the flexible lead piping is in the form of a control valve, the core of which is ground for a tight fit within the valve casing so as to overcome the necessity of any packing and also in order to require a relatively great amount of turning power in order to open said valve for thereby preventing the actuation of the valve by small children which would obviously allow the gas to escape.

With the foregoing and other objects in view, as the nature of the invention will be better understood, the same comprises the novel form, combination and arrangement of parts hereinafter more fully described, shown in the accompanying drawing and claimed.

In the drawing, the figure is a detailed longitudinal sectional view of a fitting constructed in accordance with the present invention.

Now having particular reference to the drawing, the present fitting comprises a suitable length of flexible lead piping 5 that is equipped at its opposite ends with couplings designated generally 6 and 7 for allowing said pipe to be positioned between the inlet of the gas stove, burner, grate or other device to be connected to a gas inlet pipe.

The member 6 is in the form of a brass valve structure that includes a valve core casing 8 through which extends a longitudinal passageway 9 and a transverse tapered opening 10 within which is to be disposed a tapered valve core 11 of conventional design, said core adapted to be ground within said opening and to be rotatably secured therein in the manner indicated generally at 12.

This valve casing 8 is formed at one end with an inlet nipple 13 within which is to be sweated and soldered one end of the before mentioned flexible lead piping 5. The other end of this casing 8 is formed with an internally screw threaded cup 14 that has communication with said casing and that is adapted to be associated with the inlet of the gas stove, burner, grate or other gas burning device.

The coupling 7 at the opposite end of this flexible lead piping 5 includes a brass sleeve 15 that is externally screw threaded at its outer end and within which this end of said piping 5 is to be sweated and soldered. Further, this coupling 7 includes a relatively short brass pipe section 16 that is laterally flanged at its inner end and both internally and externally screw threaded at its outer end. This brass pipe section 16 is adapted to be positioned in alinement with the lead piping 5 and to be separated therefrom by a leak-proof gas jet 17. Slidable on this relatively short brass pipe section 16, is an octagon or hexagonal shaped tightening gland 18 that is internally screw threaded at one end for engagement over the externally screw threaded end of the sleeve 15 in the securing of said pipe section 16 to said sleeve 15, it being noted that the front end of this gland is flanged inwardly at 19 for obviously engaging the flanged end of the pipe section 16 whereby a turning up of said gland will obviously draw the pipe section 16 into tight engagement with the end of the flexible piping 5.

In actual use, the internally screw threaded cup 14 is disposed upon the inlet pipe of the gas stove, burner, etc. The relatively short pipe section of the coupling 7 is removed from the pipe by unscrewing the gland 18 after which this relatively short pipe section is connected with the outlet of the gas supply pipe. The flexible lead piping 5 is then bent into the desired shape after which the gland 18 may be associated with the sleeve 15 upon the end of the piping 5 for operatively connecting the gas burner with said gas supply pipe.

The specific functioning, as well as numerous advantages of a fitting of this character will be at once appreciated by those skilled in the art, and even though I have herein set forth the most practical embodiments of the invention with which I am at this time familiar, it is nevertheless to be understood that minor changes may be made in the invention without departing from the spirit and scope of the appended claim.

Having thus described my invention, what I claim as new and desire to secure by Letters Patent is:

A fitting of the class described comprising a single length of lead pipe provided upon its exterior and adjacent its opposite ends with outstanding lateral flanges forming annular shoulders, a sleeve of relatively hard metal mounted upon one end of the pipe and having its inner end abutting the adjacent shoulder and having its outer end flush with the adjacent end of the pipe, the last named end of said sleeve being externally screw threaded, a nipple externally screw threaded at one end and provided at its opposite end with a flange, packing interposed between said flange and the ends of said sleeve and lead pipe, a coupling cap threaded on said sleeve and engaged with said nipple flange to swivelly mount said nipple, and a valve at the opposite end of the lead pipe embodying a casing threaded at its outer end and having its opposite inner end telescopically receiving the adjacent end of the lead pipe and bearing against the adjacent shoulder of said lead pipe.

DAVID R. HOOK.